United States Patent [19]

Shimada et al.

[11] Patent Number: 4,979,048
[45] Date of Patent: Dec. 18, 1990

[54] APPARATUS FOR AND METHOD OF STOP CONTROL FOR A SPINDLE MOTOR IN A DISK PLAYER

[75] Inventors: Naoki Shimada; Hidehiro Ishii; Masuhiro Sato; Masayori Shinohara, all of Saitama, Japan

[73] Assignee: Pioneer Electronic Corporation, Tokyo, Japan

[21] Appl. No.: 309,648

[22] Filed: Feb. 13, 1989

[30] Foreign Application Priority Data

Jun. 10, 1988 [JP] Japan ................. 63-144544

[51] Int. Cl.⁵ .................. H04N 5/76; G11B 7/00
[52] U.S. Cl. ............................ 358/342; 358/341; 369/44.26
[58] Field of Search ............ 369/32, 33, 44.14, 44.26, 369/44.27; 358/335, 342, 341, 343; 360/73.03

[56] References Cited

U.S. PATENT DOCUMENTS

| | | | |
|---|---|---|---|
| 4,481,615 | 11/1984 | Hioki | 358/338 |
| 4,509,160 | 4/1985 | Eggers | 360/103 |
| 4,716,558 | 12/1987 | Katayama et al. | 360/72.2 |
| 4,761,692 | 8/1988 | Yoshida et al. | 358/335 |
| 4,829,498 | 5/1989 | Aoyagi et al. | 369/45 |
| 4,831,469 | 5/1989 | Hanson et al. | 360/75 |
| 4,872,068 | 10/1989 | Ishii et al. | 358/342 |

FOREIGN PATENT DOCUMENTS

| | | |
|---|---|---|
| 0242215 | 10/1987 | European Pat. Off. |
| 2470506 | 5/1981 | France |
| 55-045126 | 3/1980 | Japan |
| 63-316682 | 12/1988 | Japan |

*Primary Examiner*—Robert L. Richardson
*Attorney, Agent, or Firm*—Sughrue, Mion, Zinn, Macpeak & Seas

[57] ABSTRACT

An apparatus and a method of stopping a spindle motor for rotating a composite disk in a disk player. The composite disk contains a first area having information recorded thereon at a first rotational frequency, and a second area having information recorded thereon at a second rotational frequency which is greater than the first rotational frequency. The spindle motor is stopped when a stop or eject command is instructed during or after information is read from the second area of the composite disk by moving a pickup for reproducing information recorded on the disk to the first area and supplying a counter torque brake signal to the spindle motor, thereby slowing the rotational frequency of the disk to a rotational frequency in which information can be read from the first area. A further counter torque brake signal is supplied to the spindle motor for a predetermined amount of time after the moved pickup begins to read information recorded on the first area to thereby stop the rotation of the composite disk.

10 Claims, 3 Drawing Sheets

APPARATUS FOR AND METHOD OF STOP CONTROL FOR A SPINDLE MOTOR IN A DISK PLAYER

FIELD OF THE INVENTION

The present invention relates to an apparatus and method of stop control for a spindle motor, and more particularly, relates to an apparatus and method of stop control for a spindle motor which serves to rotate a composite disk at a high speed.

BACKGROUND OF THE INVENTION

As is shown in FIG. 1, there has been proposed a composite disk 1, known as a CDV, having information recorded thereon, and which is divided into an inner-circumferential first area (hereinafter referred to as a "CD area") 1a and an outer-circumferential second area (hereinafter referred to as a "video area") 1b. In such a CDV, for example, audio information subjected to PCM (Pulse Code Modulation) is recorded in the CD area 1a, and a video signal subjected to frequency modulation and an audio signal subjected to PCM are recorded in the video area 1b.

A video signal includes a higher frequency component in comparison with a PCM signal, and therefore it is necessary to make the rotational speed of the CDV disk 1 higher when recording a signal onto the video area 1b than when recording a signal onto the CD area 1a. Consequently, it is necessary to play the video area 1b of the CDV 1 at a rotational speed which is relatively high in comparison with that in playing the CD area 1a. For example the rotational speed of the disk 1 is about several hundred rpm in the CD area 1a. whereas the rotational speed of the disk 1 in the video area 1b is about two thousand and several hundred rpm in the innermost circumference of the video area 1b, and is about one thousand and several hundred rpm in the outermost circumference of the video area 1b.

In the case of stopping a spindle motor in a disk player which can play such a composite disk, it is possible to easily stop the spindle motor when playing the CD area, for example, by supplying a counter torque brake to the spindle motor for a certain period of time after the point of time when a stop command is given because the rotational speed of the spindle motor is low when playing the CD area. On the other hand, it is impossible to perform the time stopping control operation discussed above in connection with the CD area when playing back information recorded in the video area 1b since the rotational speed of the disk is very high.

In Japanese Published Patent Application No. 63-316682 filed by the same applicant as this application, there has been proposed an apparatus comprising a rotational frequency detecting circuit for generating a rotational frequency signal with a level corresponding to the rotational frequency of a spindle motor, a level comparator for detecting when the signal level of the rotational frequency signal becomes lower than a set reference level, a window comparator for detecting when the signal level of the rotational frequency signal falls within the range between an upper limit reference level and a lower limit reference level, with the above-mentioned set reference level as a center level, so as to perform the stop control of the spindle motor on the basis of the respective detection outputs of the level and window comparators.

FIG. 2 shows an example of the apparatus disclosed in the Japanese Publication cited above. However, as seen in FIG. 2, the resulting circuit arrangement which includes the necessary rotational frequency detecting circuit and the level and window comparators is rather complicated, and therefore is expensive to produce.

SUMMARY OF THE INVENTION

The present invention has been developed in view of the shortcomings discussed above. Accordingly, an object of the present invention is to provide an apparatus for and a method of stop control for a spindle motor which solves the foregoing shortcomings by providing an inexpensive stop control system which does not require a rotational frequency detecting circuit and level and window comparators.

This and other objects of the invention are realized by an apparatus for and a method of stop control for a spindle motor according to the present invention, wherein in a disk player which can play a composite disk having a CD area and a video area, when a stop or eject command is given while or after the video area is played, an information detection point is moved to the CD area while giving counter torque brake to the spindle motor, so as to perform control to stop the spindle motor by a stop sequence operation for the CD area from a point of time when reading data in the CD area is detected.

BRIEF DESCRIPTION OF THE DRAWINGS

An embodiment of the present invention will be described in detail, with reference to the drawings, wherein.

DESCRIPTION OF THE PREFERRED EMBODIMENT

Figure 1:
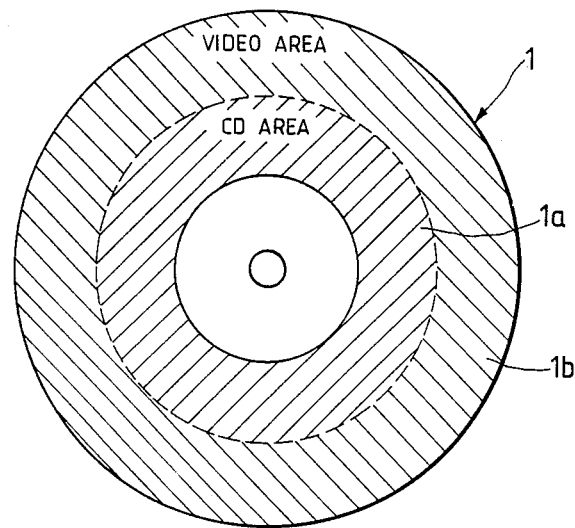
FIG. 1 is a diagram illustrating a boundary of recording areas of a conventional composite disk.
Figure 2:
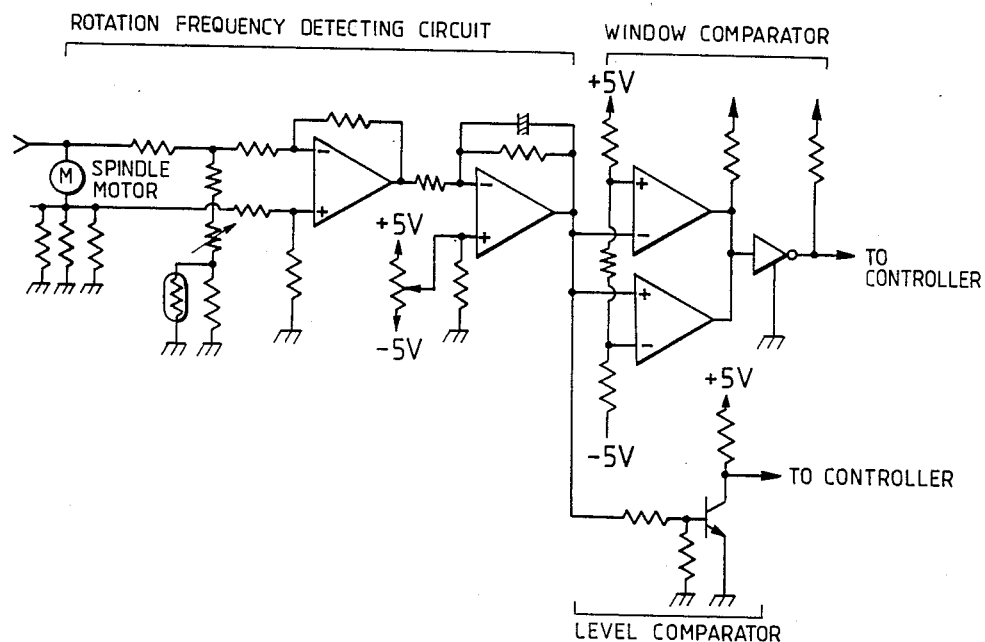
FIG. 2 is a circuit diagram illustrating a specific circuit arrangement of a rotational frequency detecting circuit and level and window comparators used in the prior art.
Figure 3:
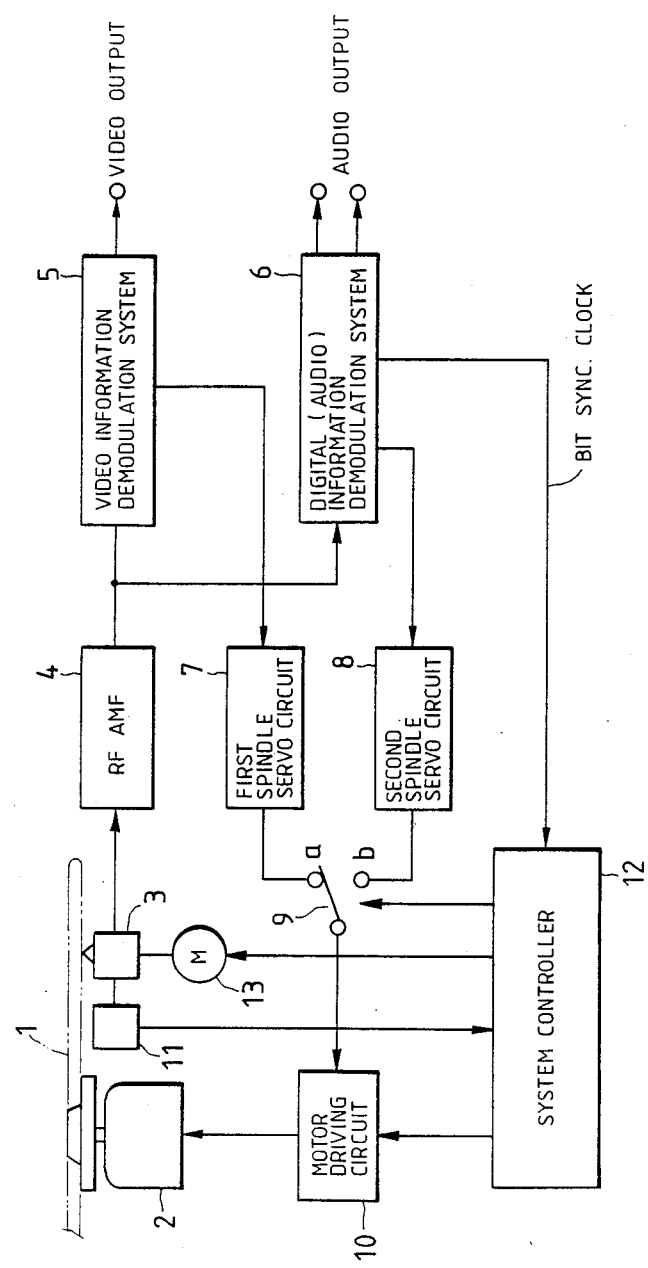
FIG. 3 is a block diagram illustrating an example of the arrangement of a disk player in which a spindle motor is stopped according to the present invention.

FIG. 3 is a block diagram illustrating an example of the arrangement of a disk player according to the present invention. In FIG. 3, a composite disk 1 is rotatably driven by a spindle motor 2, and the information carried on the disk 1 is read by an optical pickup 3. The pickup 3 is provided with a laser diode acting as a light source, an optical system having an objective lens, a four-divided light detector, a focus actuator for controlling the position of the objective lens in the light axis direction relative to the information recording surface of the disk 1, a tracking actuator for controlling the position of a main beam spot emitted from the pickup 3 in the disk radial direction relative to a recording track, and so on. The pickup 3 is provided on a carriage (not shown) which is movable in the disk radial direction, and a carriage motor 13 is provided as a driving source for the carriage. The reading output of the pickup 3 is fed through an RF amplifier 4 to a video information demodulation system 5 and to a digital (audio) information demodulation system 6.

In the video information demodulation system 5, a reproduced RF signal is demodulated into a video signal so as to perform signal processing such as time axis correction and so on, and an error signal corresponding to the phase error between a reference horizontal synchronizing signal and a reproduced horizontal synchronizing signal obtained from the video signal is generated at the same time. In the digital information demodulation system 6, on the other hand, since a PCM audio signal recorded in the CD and video areas is, for example, an EFM (Eight to Fourteen Modulation) signal, the reproduced RF signal is fed as it is to a demodulation/correction circuit (not shown) as a reproduced EFM signal in playing the CD area, and a reproduced EFM signal extracted from the reproduced RF signal is fed to the demodulation/correction circuit in playing the video area, so that the reproduced EFM signal is subjected to demodulation and error correction, and an error signal corresponding to the frequency and phase error between a reference clock and a frame synchronizing signal in the reproduced EFM signal is generated at the same time.

The respective error signals generated by the video and digital information demodulation systems 5 and 6 are fed to first and second spindle servo circuits 7 and 8 respectively. The respective outputs of the first and second spindle servo circuits 7 and 8 are selected by a change-over switch 9 so as to be alternatively fed to a motor driving circuit 10 for driving the spindle motor 2. The change-over switch 9 selects its input according to a played area of the composite disk, that is, switch 9 selects an input a in playing the video area, and an input b in playing the CD area.

A position detector 11 for detecting the moving position of a main beam spot (information detection point) emitted from the pickup 3 in the disk radial direction is provided near a moving path of the pickup 3 in the disk radial direction, and position information detected by the position detector 11 is fed to a system controller 12. On the basis of this position information, it is possible to detect whether the main beam spot is located in either the CD or video areas. The system controller 12 is constituted by a microcomputer or processor, for performing the control of switching the change-over switch 9, the control of driving/stopping the spindle motor 2 through the motor driving circuit 10, the control of driving the carriage motor 13, and so on.

Figure 4:
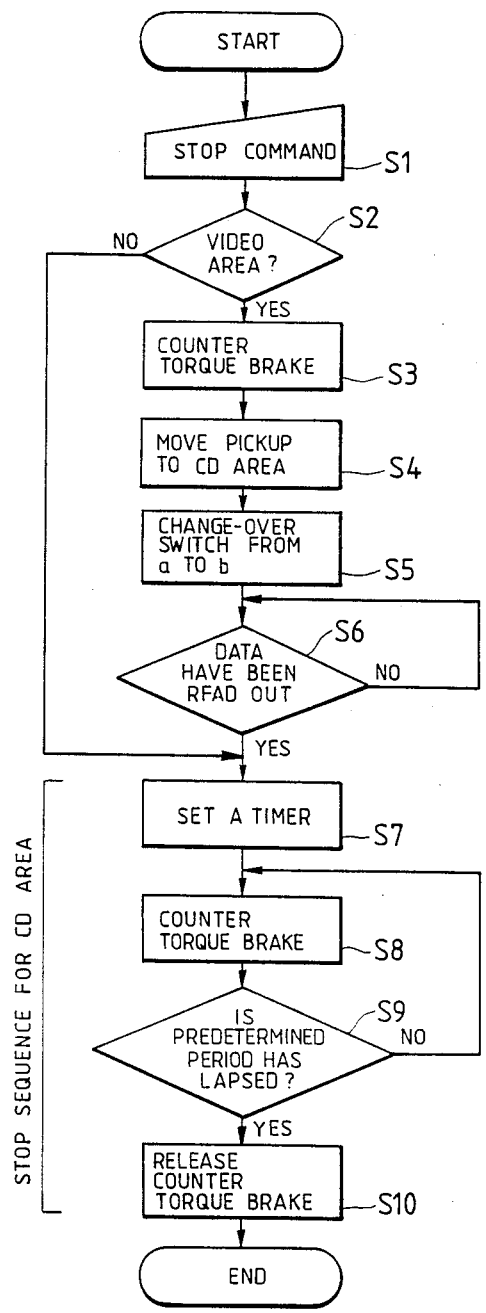
FIG. 4 is a flow chart illustrating a procedure of stop control of a spindle motor carried out by a processor in a system controller in FIG. 3.

Next, the procedure of stop control of the spindle motor 2 which is carried out by the processor of the system controller 12 will be described with reference to the flow chart shown in FIG. 4. This sub-routine is to be carried out only in a play mode.

When a stop command (STOP) is given while or after the video area of the composite disk is played (a step S1). the processor judges whether the area of the disk 1 to be played is the video area or not (a step S2), and if the answer of the judgment is "Yes", the processor controls the motor driving circuit 10 to give a counter torque brake signal to the spindle motor 2 by applying a driving voltage with a large negative polarity to the spindle motor 2 (a step S3). and at the same time drives and controls the carriage motor 13 to move the pickup 3 to the CD area (a step S4). and also at the same time switches and controls the change-over switch 9 from the a side to the b side (a step S5).

Although the rotational speed of the disk is reduced through giving counter torque brake to the spindle motor 2, it is impossible to read data from the demodulation output obtained through demodulating the read RF output of the pickup 3 before the disk's rotational frequency is lowered into a rotation range of between about 200-500 rpm. When the rotation frequency of the disk becomes near the rotation range of the CD area, a tracking servo for controlling the position of a main beam spot in the disk radial direction relative to a recording track enters in a so-called rough servo state and therefore closes its servo, so as to lock a PLL circuit (not shown) provided in the digital information demodulation system 6 for generating a bit synchronizing clock. From this time, through controlling the second spindle servo circuit 8, it becomes possible to read data of the CD area in the digital information demodulation system 6.

When the processor judges that data have been read out (a step S6). the processor sets a timer with a predetermined period (a step S7), and continues giving counter torque brake to the spindle motor 2 (a step S8). Then, when the processor judges that the predetermined period has lapsed (a step S9), the processor controls the motor driving circuit 10 to release giving counter torque brake to the spindle motor 2 (a step S10). After the counter torque brake has been released, the spindle motor 2 continues to rotate for a while by inertia before it stops.

In the case where the processor judges that the area to be played is the CD area in the step S2, the processor moves to the sep S7 directly, so as to control the spindle motor 2 to stop by a stop sequence for the CD area.

Although description has been made in the above embodiment as to the control procedure in the case where a stop command is given while or after the video area is played, the same procedure may be carried out until the step 10 in the case where an eject command (EJECT) is given, and after the procedure is completed, the processor will perform an eject operation.

As has been described, when a stop command or an eject command is given while or after the video area is played, a main beam spot is moved to the CD area while giving counter torque brake to the spindle motor 2 so as to control the spindle motor 2 to stop by a stop sequence for the CD area from a point of time when reading data in the CD area is detected. Accordingly, it is possible to perform stop control in the video area without using a rotational frequency detecting circuit and level and window comparators which require a complicated circuit arrangement.

Since a rotational frequency detecting circuit and level and window comparators are unnecessary, in the case where a poWer source is turned on and an eject command is given immediately after the power source is turned off in playing the video area, there is a possibility that a disk is ejected during its high speed rotation so that the disk is damaged. If a memory backup is provided, it is possible to judge that the power source is turned off in playing the video area. Accordingly, the disk is arranged, by time control, so as to be ejected after waiting for a period of time until the rotation of the spindle motor 2 becomes slow enough so that it is made possible to prevent a disk from being damaged.

Even without providing a memory backup, if the fact that the pickup 3 is not at its initial position can be confirmed, it is possible to judge that a disk is not in a stop state before a power source is turned on. Accordingly, if the time until the disk is ejected is prolonged by time control, the possibility that the disk is hurt can be eliminated.

As has been described above, according to the method of stop control of a spindle motor according to the present invention, when a stop command or an eject command is given while or after a video area of a composite disk is played, an information detection point is moved to a CD area while giving counter torque brake to the spindle motor, and the spindle motor is controlled to stop by a stop sequence for the CD area at a point of time when reading data in the CD area is detected so that it is possible to perform the stop control in the video area without using a rotational frequency detecting circuit and level and window comparators, whereby it is possible to make the system inexpensive.

We claim:

1. A method of stopping a spindle motor for rotating a composite disk in a disk player, the composite disk having a first area where information is recorded/reproduced at a first rotational frequency of the composite disk, and a second area where information is recorded/reproduced at a second rotational frequency of the composite disk, the second rotational frequency being greater than the first rotational frequency, the method comprising the steps of:

moving, in response to a stop or an eject command, a pickup for reproducing information recorded on the composite disk to the first area, said moving step being performed only if one of the eject or stop commands is instructed during or after information has been read from the second area;

supplying, simultaneously with said moving step, a counter torque brake signal to the spindle motor, thereby slowing the rotational frequency of the composite disk to a frequency in which information can be read from the first area; and before ejection of said composite disk in response to said eject command, performing a control operation for stopping the spindle motor, said control operation performing step beginning at a point of time when the pickup reproduces information recorded on the first area of the composite disk in accordance with said moving and supplying steps.

2. The method as defined in claim 1, wherein said control operation performing step comprises supplying a counter torque brake signal to the spindle motor for a predetermined period of time after said point of time when the pickup reproduces information recorded on the first area of the composite disk.

3. The method as defined in claim 1, wherein the first area contains audio information subjected to pulse code modulation, and the second area contains video information subjected to frequency modulation and audio information subjected to pulse code modulation.

4. An apparatus for playing back information recorded on a composite disk having a first area in which information is recorded/reproduced at a firs rotational frequency of the composite disk, and a second area in which information is recorded/reproduced at a second rotational frequency of the composite disk which is higher than the first rotational frequency, the apparatus comprising:

a movable pickup for reading information recorded on the composite disk;

a spindle motor for controlling the rotational frequency of the composite disk; and a processor coupled to said pickup and to said spindle motor, said processor being operable when a stop or an eject command is instructed during or after said movable pickup reads information recorded on the second area of the composite disk, for moving said pickup to the first area of the composite disk and for simultaneously with the movement of said pickup supplying a first counter brake torque signal to said spindle motor, thereby slowing the rotational frequency of the composite disk to a rotational frequency in with information recorded on the first area can be reproduced, said processor also being operable, prior to ejection of said composite disk in response to said eject command, when the moved pickup reproduces information from the first area of the disk in accordance with the first counter torque brake signal for supplying a second brake torque signal to said spindle motor to thereby stop the rotation of the composite disk.

5. The apparatus as defined in claim 4, wherein said second counter torque brake signal is supplied from said processor to said spindle motor for a predetermined amount of time after said moved pickup begins to reproduce information recorded on the first area of the composite disk.

6. The apparatus as defined in claim 4, wherein the first area contains audio information subjected to pulse code modulation, and the second area contains video information subjected to frequency modulation and audio information subjected to pulse code modulation.

7. The apparatus as defined in claim 4, further comprising a position detecting means coupled to said pickup for detecting the position of a reading signal emitted by said pickup onto said composite disk.

8. The apparatus as defined in claim 7, further comprising a first information demodulation system, coupled to said pickup, for outputting demodulated information recorded on the first area of the disk, and a second information demodulation system, coupled to said pickup, for outputting demodulated information recorded on the second area of the disk.

9. The apparatus as defined in claim 8, further comprising a motor driving circuit for driving said spindle motor, and wherein said first information demodulation system includes a first spindle servo circuit for supplying a first correction signal to said motor driving circuit in accordance with information reproduced from the first area of the disk, and wherein said second information demodulation circuit includes a second spindle servo circuit for supplying a second correction signal to said motor driving circuit in accordance with information reproduced from the second area of the disk.

10. The apparatus as defined in claim 9, further comprising a switch for supplying one of the first and second correction signals to said motor driving circuit, said switch being controlled by said system controller in response to position information supplied by said position detecting means.

* * * * *